United States Patent [19]

Corallo

[11] Patent Number: 5,678,596
[45] Date of Patent: Oct. 21, 1997

[54] RETRACTABLE GARDEN HOSE APPARATUS

[76] Inventor: Richard Corallo, 16 Bennington Pl., Wheatley Heights, N.Y. 11798

[21] Appl. No.: 643,865

[22] Filed: May 7, 1996

[51] Int. Cl.⁶ .................................................. F16L 5/00
[52] U.S. Cl. ............... 137/357; 137/355.16; 137/355.23; 137/360; 137/381
[58] Field of Search .................. 137/357, 360, 137/355.23, 355.16, 355.2, 381

[56] References Cited

U.S. PATENT DOCUMENTS

| | | | |
|---|---|---|---|
| 1,350,205 | 8/1920 | Anderson . | |
| 2,478,540 | 8/1949 | Martin | 137/355.2 |
| 2,519,064 | 8/1950 | Palm | 137/355.23 |
| 2,659,546 | 11/1953 | Rotter et al. | 137/355.2 |
| 2,852,216 | 9/1958 | Peters | 137/355.23 |
| 3,437,105 | 4/1969 | Stracek | 137/355.23 |
| 3,776,262 | 12/1973 | Fritsch | 137/355.16 |
| 4,227,661 | 10/1980 | King et al. | 137/355.27 |
| 4,757,838 | 7/1988 | McGullion | 137/355.27 |
| 5,568,824 | 10/1996 | Cordey | 137/355.27 |

FOREIGN PATENT DOCUMENTS

| | | | |
|---|---|---|---|
| 50004 | 11/1939 | France | 137/355.23 |

Primary Examiner—A. Michael Chambers
Attorney, Agent, or Firm—Michael I. Kroll

[57] ABSTRACT

A retractable garden hose apparatus (10) comprising a reel assembly (12) mounted to a ceiling joist (14) within a basement (16) adjacent an exterior wall (18) of a building (20). A facility (22) is for fluidly coupling a first end of a garden hose (24) in the reel assembly (12), when the garden hose (24) is wrapped within the reel assembly (12). A funnel shaped sleeve (26) is connected between the reel assembly (12) and an aperture (28) in the exterior wall (18) of the building (20), so that the funnel shaped sleeve (26) will guide the garden hose (24) through the aperture (28) in the exterior wall (18) of the building (20). An outdoor enclosure (30) is mounted to the exterior wall (18) of the building (20) at the aperture (28). The enclosure (30) has a rear opening (32) in alignment with the aperture (28) in the exterior wall (18), so that a second free end of the garden hose (24) extending therethrough will be covered by the enclosure (30). A structure (34) fits through the rear opening (32) in the enclosure (30) and the aperture (28) in the exterior wall (18) of the building (20), for sealing the rear opening (32) about the garden hose (24), to prevent the entrance of leaves, soil and air.

19 Claims, 3 Drawing Sheets

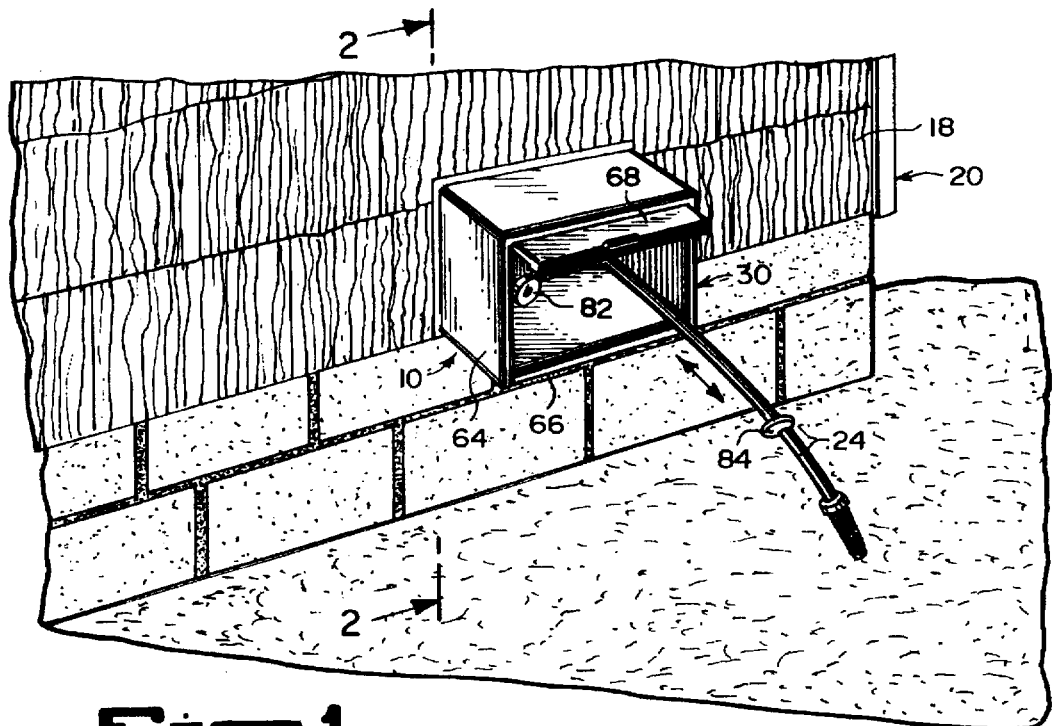
Fig. 1
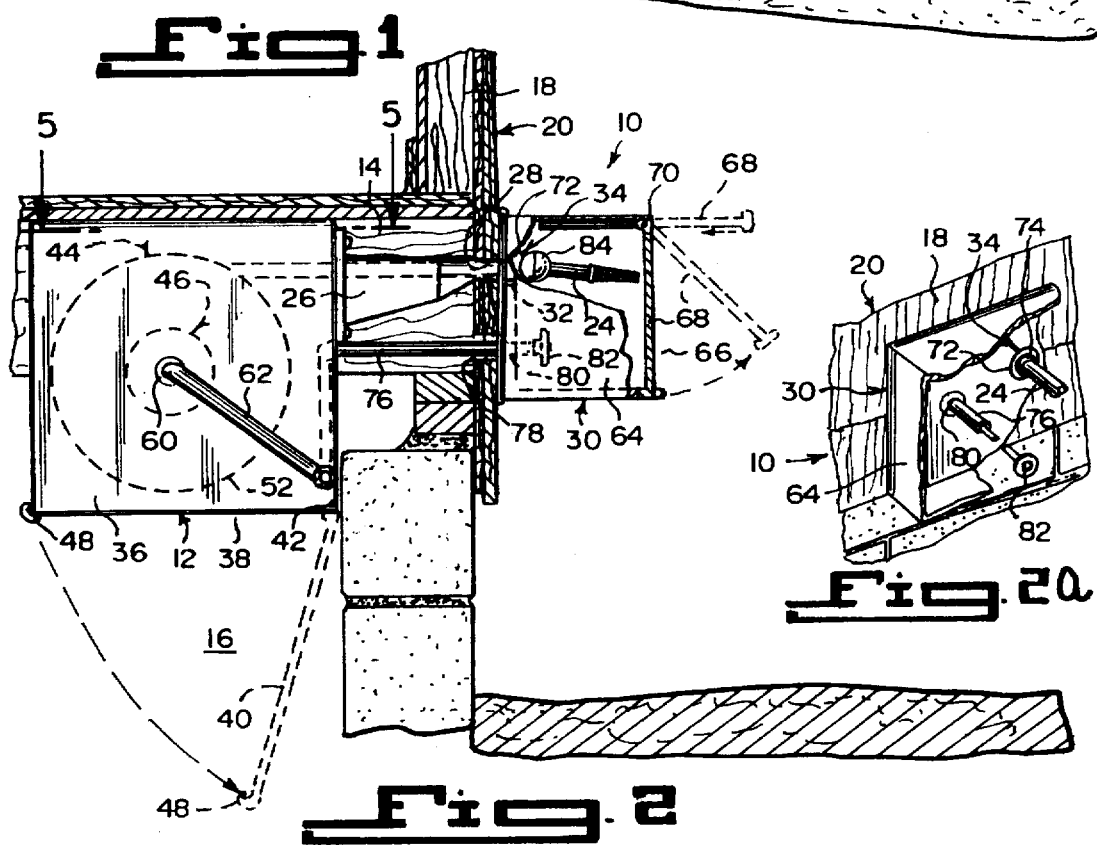
Fig. 2
Fig. 2a

RETRACTABLE GARDEN HOSE APPARATUS

BACKGROUND OF THE INVENTION

1. Field of the Invention

The instant invention relates generally to hose reels and more specifically it relates to a retractable garden hose apparatus.

2. Description of the Prior Art

Numerous hose reels have been provided in prior art. For example, U.S. Pat Nos. 1,350,205 to Anderson; 3,776,262 to Fritsch; 4,227,661 to King et al. and 4,757,838 to McGullion all are illustrative of such prior art. While these units may be suitable for the particular purpose to which they address, they would not be as suitable for the purposes of the present invention as heretofore described.

ANDERSON, JOHN E.

HOSE REEL

U.S. Pat. No. 1,350,205

A hose reel comprising a hollow standard. A hollow cylindrical casing is mounted upon the upper end of the standard and has a door in one side. A reel is journaled longitudinally through the casing. A handle is on one end of the reel exteriorly of the casing. A hose is wrapped upon the reel. The opposite end of the reel from the handle is formed with a bore with which one end of the hose communicates. A supply pipe extends through the standard and is disposed laterally through the lower portion of the casing. A connection is outside of the casing at the end opposite the handle between the upper end of the supply pipe and the bore of the reel. A gage is associated with the connection.

FRITSCH, UDO H.

ENCLOSURE FOR COILED GARDEN HOSE

U.S. Pat. No. 3,776,262

A generally cylindrical garden hose enclosure is carried on an annular base which encircles a sill cock when detachably mounted on the exterior wall of a house. The enclosure cover is cylindrical near the base, and truncated conical at the front, where it terminates in a dispensing opening. The hose is coiled around the inside of the cylindrical chamber, rather than being tightly wrapped around a core, and therefore does not kink and it is hidden from view by the truncated conical part of the cover.

KING, WILLIAM

KING, EDWARD

LATCHING MECHANISM AND WINDING APPARATUS INCLUDING SAME

U.S. Pat. No. 4,227,661

The invention provides a latching mechanism including a pawl, a ratchet wheel having a recess engageable with the pawl to restrict rotation of the wheel in one direction and cam means associated with the wheel and operative on rotation thereof in one direction to urge the pawl away from the recess. The pawl is biased solely by gravity to move toward the recess whereby to enable engagement in the recess. The gravity bias acting on the pawl will be insufficient to cause the pawl to be in a position to engage the recess when the angular velocity of the wheel is in excess of a predetermined latching velocity. The latching mechanism may be used in a winding apparatus for a hose.

McGILLION, HAROLD

FIRE HOSE REEL

U.S. Pat. No. 4,757,838

An improved swivel fire hose reel is particularly suitable for use with fire safety equipment for industrial installations. A reel having a substantially vertical axis is pivotably mounted on a base, enabling the reel to rotate three hundred sixty degrees and allows the hose to unwind at any desired angle with respect to the fire. A fluid inlet to the reel is affixed to the base, and a single fluid swivel joint enhances reliability and reduces cost of the reel assembly. An outer guard is mounted about rotatable with respect to the reel to further enhance safety and reliability.

SUMMARY OF THE INVENTION

A primary object of the present invention is to provide a retractable garden hose apparatus that will overcome the shortcomings of the prior art devices.

Another object is to provide a retractable garden hose apparatus that eliminates the need for a person to manually roll up a garden hose when not in use.

An additional object is to provide a retractable garden hose apparatus in which the garden hose being kept rolled up within the apparatus indoors, is not exposed to the bad effects of weathering outdoors of a building.

A further object is to provide a retractable garden hose apparatus that is simple and easy to use.

A still further object is to provide a retractable garden hose apparatus that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a front perspective view of the instant invention installed through an exterior wall of a building.

FIG. 2 is a cross sectional view taken along line 2—2 in FIG. 1, with parts broken away.

FIG. 2a is a front perspective view similar to FIG. 1, with parts broken away.

3

Figure 3:
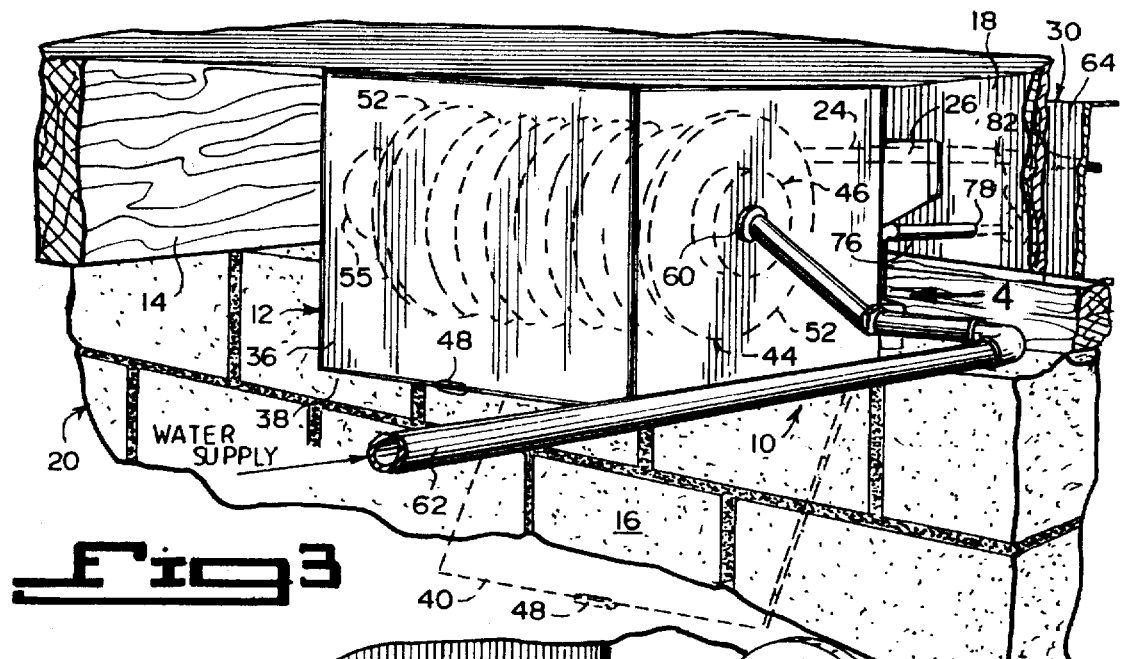
FIG. 3 is a rear perspective view of the instant invention installed through the exterior wall of the building, with parts broken away and in section.
Figure 4:
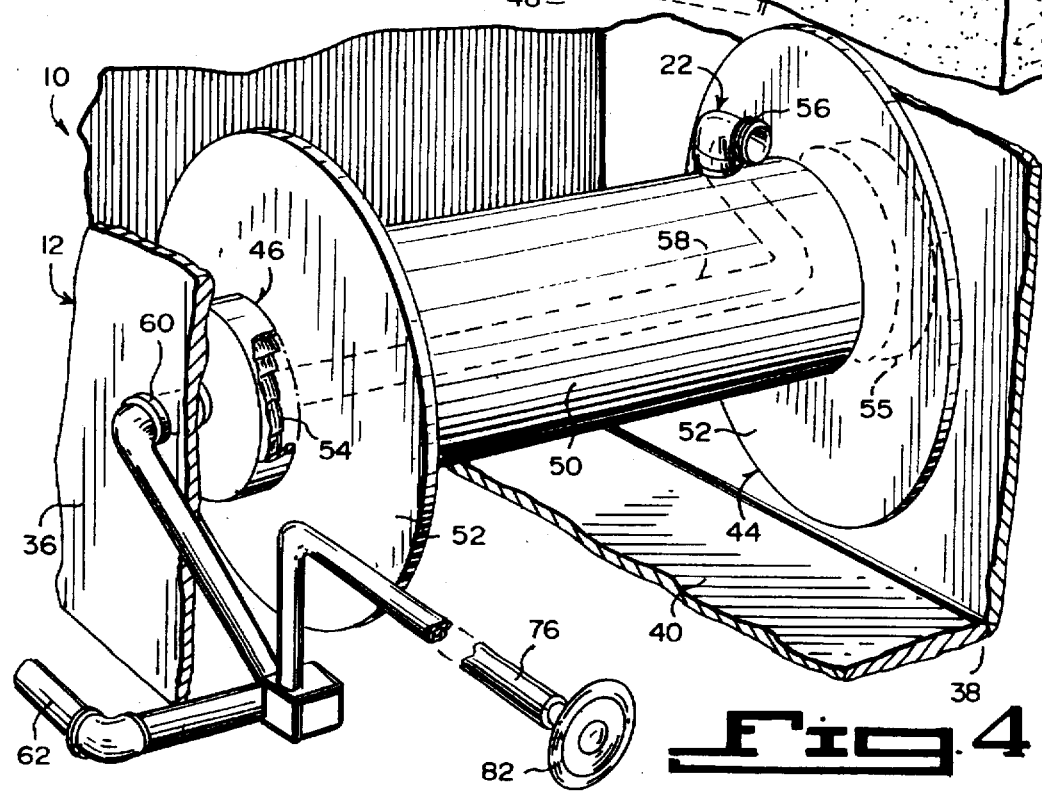
FIG. 4 is an enlarged perspective view taken in the direction of arrow 4 in FIG. 3, with parts broken away and in section, showing the reel assembly in greater detail.
Figure 5:
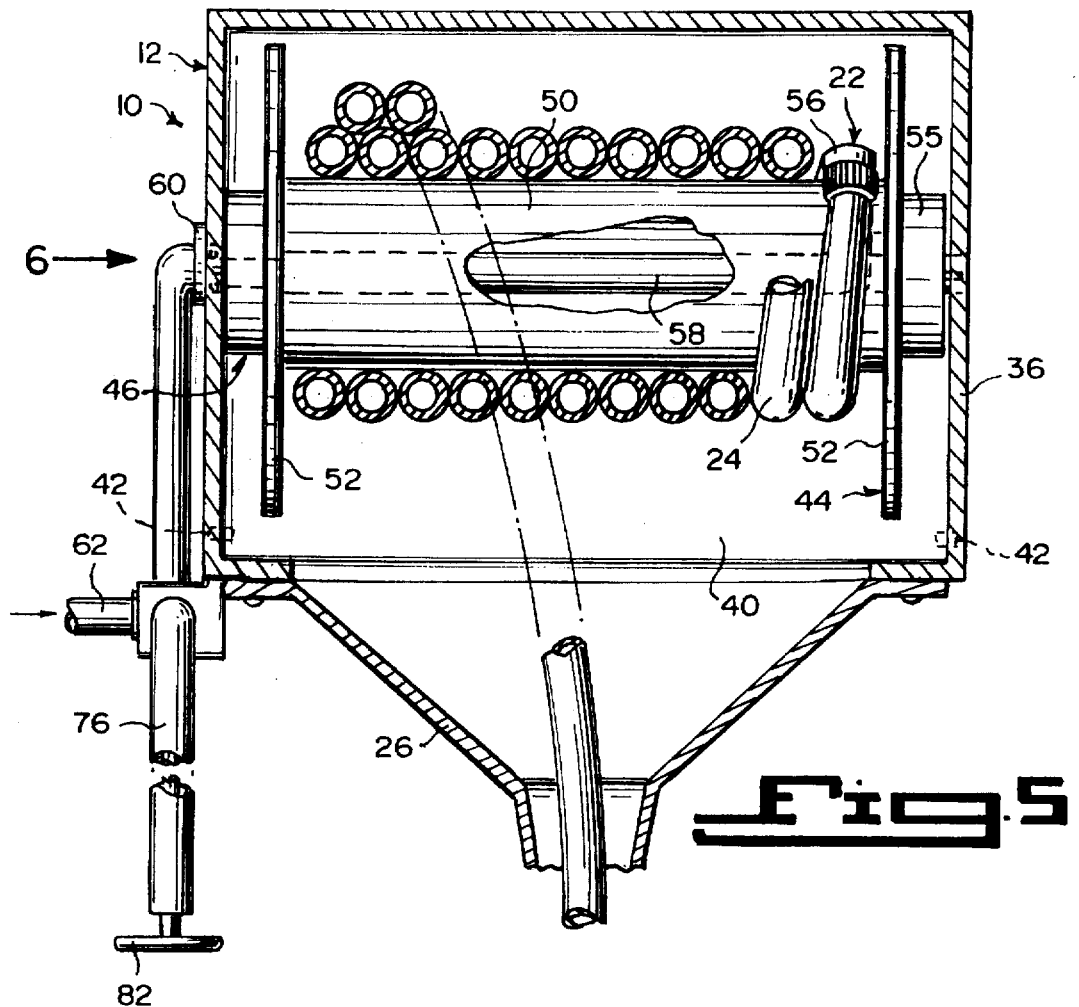

FIG. 5 is an enlarged cross sectional view taken along line 5—5 in FIG. 2, with parts broken away.

Figure 6:
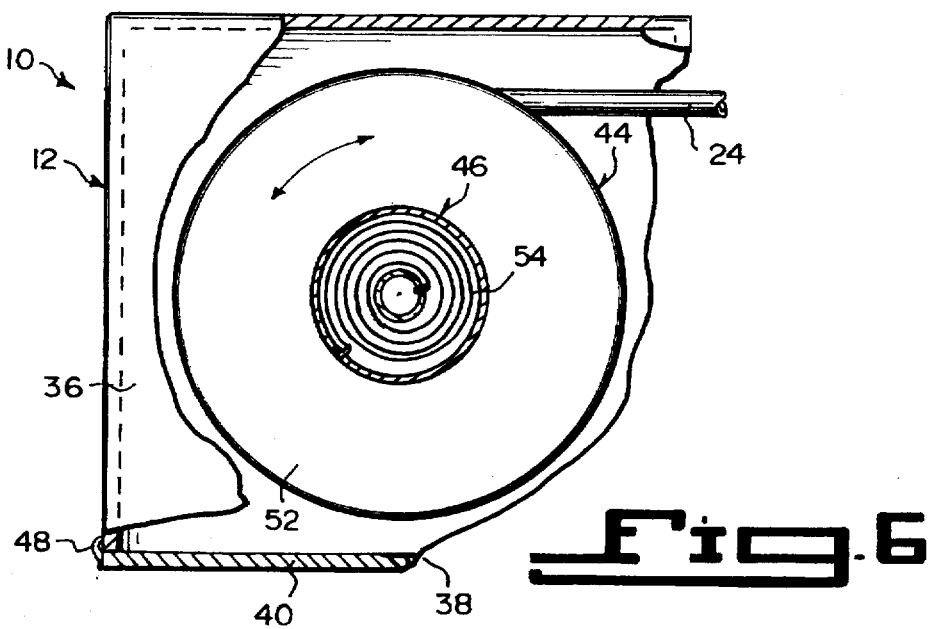

FIG. 6 is an end view taken in the direction of arrow 6 in FIG. 5, with parts broken away and in section.

Similar reference characters denote corresponding features consistently throughout the attached drawings.

DETAILED DESCRIPTION OF THE PREFERRED EMBODIMENTS

Turning now descriptively to the drawings, in which similar reference characters denote similar elements throughout the several views, FIGS. 1 through 6 illustrate a retractable garden hose apparatus 10 comprising a reel assembly 12 mounted to a ceiling joist 14 within a basement 16 adjacent an exterior wall 18 of a building 20. A facility 22 is for fluidly coupling a first end of a garden hose 24 in the reel assembly 12, when the garden hose 24 is wrapped within the reel assembly 12. A funnel shaped sleeve 26 is connected between the reel assembly 12 and an aperture 28 in the exterior wall 18 of the building 20, so that the funnel shaped sleeve 26 will guide the garden hose 24 through the aperture 28 in the exterior wall 18 of the building 20.

An outdoor enclosure 30 is mounted to the exterior wall 18 of the building 20 at the aperture 28. The enclosure 30 has a rear opening 32 in alignment with the aperture 28 in the exterior wall 18, so that a second free end of the garden hose 24 extending therethrough will be covered by the enclosure 30. A structure 34 fits through the rear opening 32 in the enclosure 30 and the aperture 28 in the exterior wall 18 of the building 20, for sealing the rear opening 32 about the garden hose 24, to prevent the entrance of leaves, soil and air.

The reel assembly 12 includes a box shaped housing 36 having an open bottom 38. A door 40 is hinged at 42 to the open bottom 38 of the housing 36, so as to gain access to the housing 36. A reel 44 is journaled longitudinally in the housing 36 in a rotatable manner. An assemblage 46 is for spring biasing the reel 44 to the housing 36, so that the reel 44 will normally wrap up the garden hose 24 thereabout. A latch member 48 is on the door 40, so as to keep the door 40 in a closed position to the open bottom 38 of the housing 36.

The reel 44 consists of a barrel 50 and a pair of flange ends 52 on the barrel 50, to properly keep the garden hose 24 wrapped up on the barrel 50. The spring biasing assemblage 46 is a coil spring 54 between the housing 36 and the reel 44. When a free end of the garden hose 24 is manually pulled it will unwrap from the reel 44 and the coil spring 54 will tighten. A ratchet type latching mechanism 55 is between the housing 56 and the reel 44. When a desired length of the garden hose 24 is pulled out, the latching mechanism 55 will lock in place. To retract the garden hose 24, a slight pull will unlatch the reel 44, thereby allowing the garden hose 24 to automatically re-wrap on the reel 44 when the free end of the garden hose 24 is released.

The fluidly coupling facility 22 includes a hose fitting 56 on the reel 44 adjacent one end. A pipe 58 runs centrally through the reel 44 and is connected to the hose fitting 56. A swivel joint 60 is connected to the pipe 58 at one side of the housing 36 opposite the hose fitting 56, whereby the swivel joint 60 is connected to a water supply line 62.

The outdoor enclosure 30 comprises a box shaped casing 64, having an open front 66. A cover 68 is hinged at 70 to the casing 64 at the open front 66 in a sliding stored manner to gain access to the casing 64.

The sealing structure 34 is a flanged collar 72 that is inserted through the rear opening 32 in the enclosure 30 and into an end of the sleeve 26 in the aperture 28 in the exterior wall 18 of the building 20. A rubber gasket 74 is in the flanged collar 72, to extend about the garden hose 24.

An auxiliary pipe 76 is connected to the water supply line 62. the auxiliary pipe 76 extends through a second aperture 78 in the exterior wall 18 of the building 20 and a second rear opening 80 in the outdoor enclosure 30 that is in alignment with the second aperture 78 in the exterior wall 18. A remote on/off water valve 82 is connected to the auxiliary pipe 76 within the outdoor enclosure 30, so that a person can turn the water on and off to the garden hose 24 from the outdoor enclosure 30. A two piece ball stop 84 screws together on the garden hose 24 adjacent a free end thereof, to halt the retraction of the garden hose 24 and seal against the rubber gasket 74 of the sealing structure 34.

LIST OF REFERENCE NUMBERS 10 retractable garden hose apparatus
12 reel assembly of 10
14 ceiling joist of 20
16 basement of 20
18 exterior wall of 20
20 building
22 fluidly coupling facility of 10
24 garden hose
26 funnel shaped sleeve of 10
28 aperture in 18
30 outdoor enclosure of 10
32 rear opening in 30
34 sealing structure of 10
36 box shaped housing of 12
38 open bottom of 36
40 door of 12
42 hinge between 38 and 40
44 reel of 12
46 spring biasing assemblage of 12
48 latch member on 40
50 barrel of 44
52 flange end of 44
54 coil spring of 46
55 ratchet type latching mechanism of 46
56 hose fitting of 22
58 pipe of 22
60 swivel joint of 22
62 water supply line
64 box shaped casing of 30
66 open front of 64
68 cover of 30
70 hinge between 66 and 68
72 flanged collar of 34
74 rubber gasket of 34
76 auxiliary pipe
78 second aperture in 18
80 second rear opening in 30
82 remote on/off water valve on 76
84 two piece ball stop It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A retractable garden hose apparatus comprising:
   a) a reel assembly mounted to a ceiling joist within a basement adjacent an exterior wall of a building;
   b) means for fluidly coupling a first end of a garden hose in said reel assembly, when the garden hose is wrapped within said reel assembly;
   c) a funnel shaped sleeve connected between said reel assembly and an aperture in the exterior wall of the building, so that said funnel shaped sleeve will guide the garden hose through the aperture in the exterior wall of the building;
   d) an outdoor enclosure mounted to the exterior wall of the building at the aperture, said enclosure having a rear opening in alignment with the aperture in the exterior wall, so that a second free end of the garden hose extending therethrough will be covered by said enclosure; and
   e) means, which fits through said rear opening in said enclosure and the aperture in the exterior wall of the building, for sealing said rear opening about the garden hose, to prevent the entrance of leaves, soil and air.

2. A retractable garden hose apparatus as recited in claim 1, wherein said reel assembly includes:
   a) a box shaped housing having an open bottom;
   b) a door hinged to the open bottom of said housing, so as to gain access to said housing;
   c) a reel journaled longitudinally in said housing in a rotatable manner; and
   d) means for spring biasing said reel to said housing, so that said reel will normally wrap up the garden hose thereabout.

3. A retractable garden hose apparatus as recited in claim 2, further including a latch member on said door, so as to keep said door in a closed position to the open bottom of said housing.

4. A retractable garden hose apparatus as recited in claim 2, wherein said reel includes:
   a) a barrel; and
   b) a pair of flange ends on said barrel, to properly keep the garden hose wrapped up on said barrel.

5. A retractable garden hose apparatus as recited in claim 2, wherein said spring biasing means includes:
   a) a coil spring between said housing and said reel, so that when a free end of the garden hose is manually pulled it will unwrap from said reel and said coil spring will tighten; and
   b) a ratchet type latching mechanism between said housing and said reel, so that when a desired length of the garden hose is pulled out, said latching mechanism will lock in place, then to retract the garden hose, a slight pull will unlatch said reel, thereby allowing the garden hose to automatically re-wrap on said reel when the free end of the garden hose is released.

6. A retractable garden hose apparatus as recited in claim 5, further including:
   a) an auxiliary pipe connected to the water supply line, said auxiliary pipe extends through a second aperture in the exterior wall of the building and a second rear opening in said outdoor enclosure that is in alignment with the second aperture in the exterior wall; and
   b) a remote on/off water valve connected to said auxiliary pipe within said outdoor enclosure, so that a person can turn the water on and off to the garden hose from said outdoor enclosure.

7. A retractable garden hose apparatus as recited in claim 2, wherein said fluidly coupling means includes:
   a) a hose fitting on said reel adjacent one end;
   b) a pipe running centrally through said reel and connected to said hose fitting; and
   c) a swivel joint connected to said pipe at one side of said housing opposite said hose fitting, whereby said swivel joint is connected to a water supply line.

8. A retractable garden hose apparatus as recited in claim 1, wherein said outdoor enclosure includes:
   a) a box shaped casing having an open front; and
   b) a cover hinged to said casing at the open front in a sliding stored manner to gain access to said casing.

9. A retractable garden hose apparatus as recited in claim 8, further including a two piece ball stop which screws together on the garden hose adjacent a free end thereof, to halt the retraction of the garden hose and seal against said rubber gasket of said sealing means.

10. A retractable garden hose apparatus as recited in claim 1, wherein said sealing means includes:
    a) a flanged collar that is inserted through said rear opening in said enclosure and into an end of said sleeve in the aperture in the exterior wall of the building; and
    b) a rubber gasket in said flanged collar to extend about the garden hose.

11. A retractable garden hose apparatus comprising:
    a) a reel assembly mounted to a ceiling joist within a basement adjacent an exterior wall of a building, wherein said reel assembly includes a box shaped housing having an open bottom, a door hinged to the open bottom of said housing, so as to gain access to said housing, a reel journaled longitudinally in said housing in a rotatable manner and means for spring biasing said reel to said housing, so that said reel will normally wrap up the garden hose thereabout;
    b) means for fluidly coupling a first end of a garden hose in said reel assembly, when the garden hose is wrapped within said reel assembly;
    c) a funnel shaped sleeve connected between said reel assembly and an aperture in the exterior wall of the building, so that said funnel shaped sleeve will guide the garden hose through the aperture in the exterior wall of the building;
    d) an outdoor enclosure mounted to the exterior wall of the building at the aperture, said enclosure having a rear opening in alignment with the aperture in the exterior wall, so that a second free end of the garden hose extending therethrough will be covered by said enclosure; and
    e) means, which fits through said rear opening in said enclosure and the aperture in the exterior wall of the building, for sealing said rear opening about the garden hose, to prevent the entrance of leaves, soil and air.

12. A retractable garden hose apparatus as recited in claim 11, further including a latch member on said door, so as to keep said door in a closed position to the open bottom of said housing.

13. A retractable garden hose apparatus as recited in claim 12, wherein said reel includes:

a) a barrel; and b) a pair of flange ends on said barrel, to properly keep the garden hose wrapped up on said barrel.

14. A retractable garden hose apparatus as recited in claim 13, wherein said spring biasing means includes:

a) a coil spring between said housing and said reel, so that when a free end of the garden hose is manually pulled it will unwrap from said reel and said coil spring will tighten; and b) a ratchet type latching mechanism between said housing and said reel, so that when a desired length of the garden hose is pulled out, said latching mechanism will lock in place, then to retract the garden hose, a slight pull will unlatch said reel, thereby allowing the garden hose to automatically re-wrap on said reel when the free end of the garden hose is released.

15. A retractable garden hose apparatus as recited in claim 14, wherein said fluidly coupling means includes:

a) a hose fitting on said reel adjacent one end;

b) a pipe running centrally through said reel and connected to said hose fitting; and c) a swivel joint connected to said pipe at one side of said housing opposite said hose fitting, whereby said swivel joint is connected to a water supply line.

16. A retractable garden hose apparatus as recited in claim 15, wherein said outdoor enclosure includes:

a) a box shaped casing having an open front; and b) a cover hinged to said casing at the open front in a sliding stored manner to gain access to said casing.

17. A retractable garden hose apparatus as recited in claim 16, wherein said sealing means includes:

a) a flanged collar that is inserted through said rear opening in said enclosure and into an end of said sleeve in the aperture in the exterior wall of the building; and b) a rubber gasket in said flanged collar to extend about the garden hose.

18. A retractable garden hose apparatus as recited in claim 17, further including:

a) an auxiliary pipe connected to the water supply line, said auxiliary pipe extends through a second aperture in the exterior wall of the building and a second rear opening in said outdoor enclosure that is in alignment with the second aperture in the exterior wall; and b) a remote on/off water valve connected to said auxiliary pipe within said outdoor enclosure, so that a person can turn the water on and off to the garden hose from said outdoor enclosure.

19. A retractable garden hose apparatus as recited in claim 18, further including a two piece ball stop which screws together on the garden hose adjacent a free end thereof, to halt the retraction of the garden hose and seal against said rubber gasket of said sealing means.

* * * * *